Patented Oct. 4, 1949

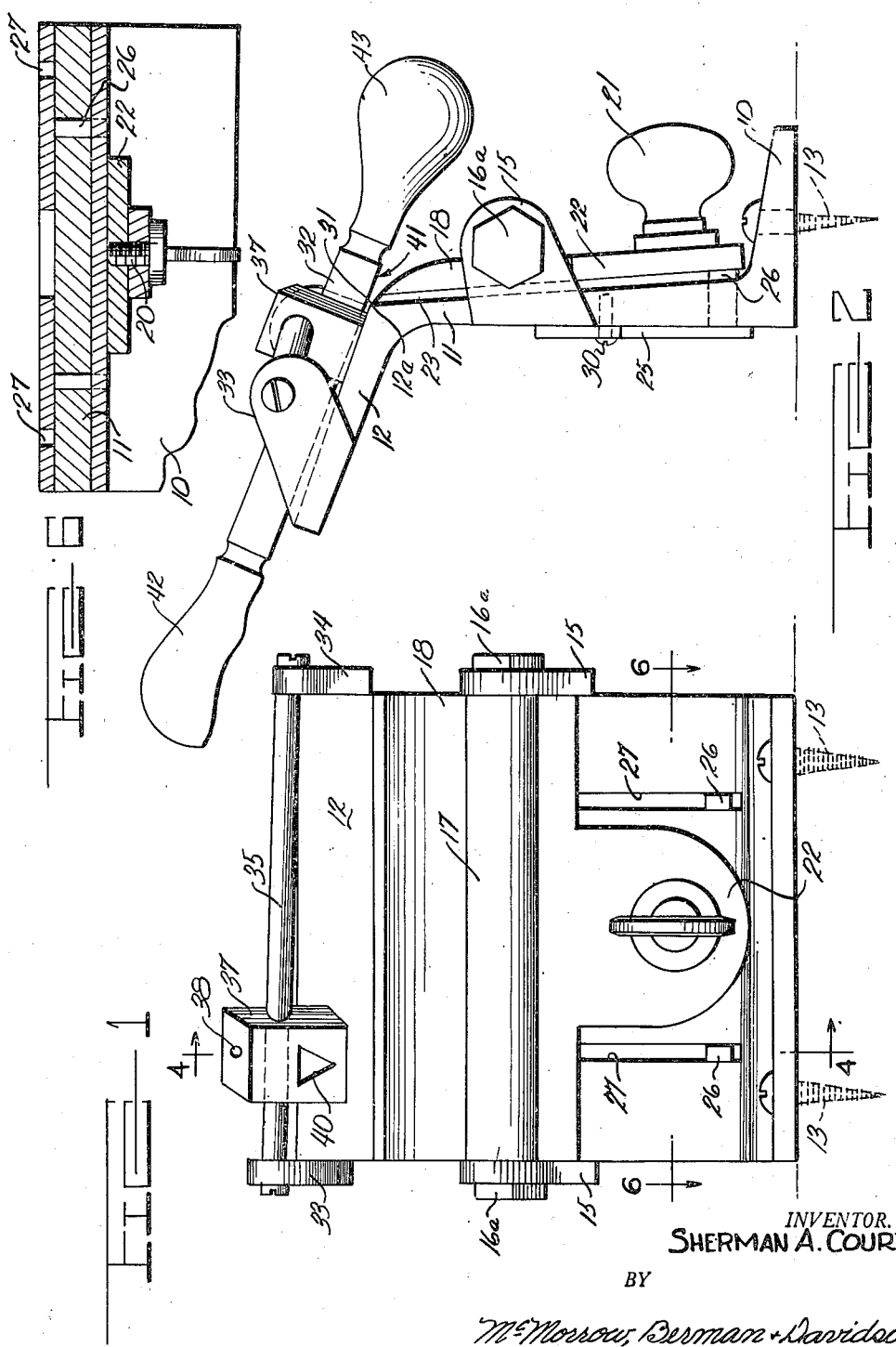

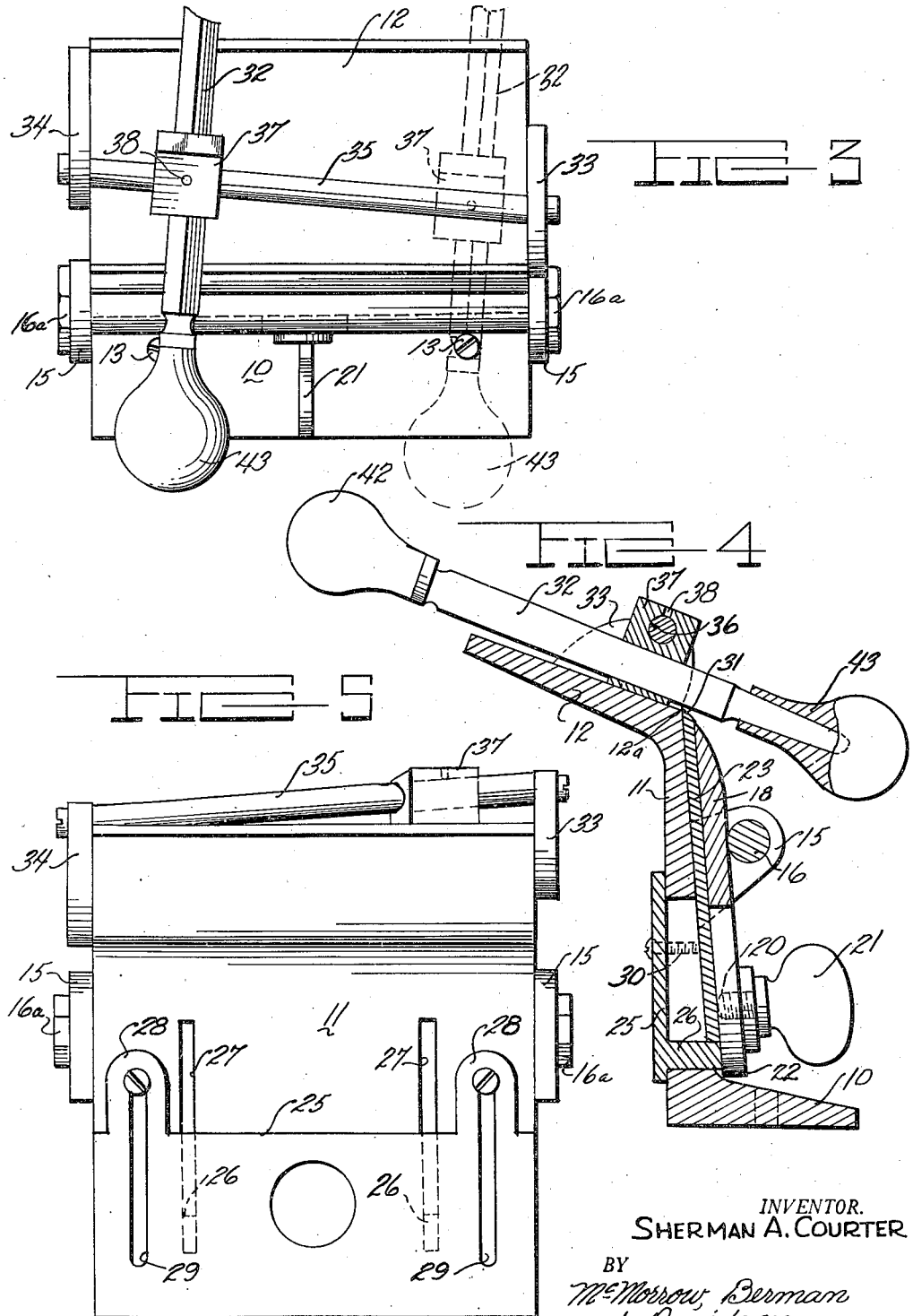

2,483,624

UNITED STATES PATENT OFFICE 2,483,624

EDGER FOR SCRAPERS

Sherman A. Courter, Claremont, Calif.; Hilda L. Adams executrix of said Sherman A. Courter, deceased Application October 22, 1948, Serial No. 56,023

3 Claims. (Cl. 76—82)

This invention relates to a device for forming an edge on a scraper blade.

An object of the invention is the provision of a device for producing a uniform cutting edge on a scraper blade in which a burnishing tool is supported slidably over the cutting edge of and at an acute angle to the blade so that when the tool is shifted along a table forming a support for said tool various points on the burnishing edge thereof will come into contact with the cutting edge, means being employed for retaining the cutting edge of the blade in a predetermined position relative to the tool and to an adjacent edge of the table.

A further object of the invention is the provision of a device for producing a uniform cutting edge on a scraper blade in which a vertical standard fixed to a work bench is adapted to support the scraper blade vertically so that its cutting edge will rise slightly above one edge of a table extending from the top of the standard so that when a burnishing tool slidably supported over the table is drawn along the cutting edge of the blade, the cutting edge of the blade is curved backwardly a given amount to properly form a scraping edge suitable to provide a uniform depth of cut when said blade is used in shaving surfaces of wood, the burnishing tool being supported at an acute angle to the surface of the scraper blade.

The invention is best understood from a consideration of the following detailed description in connection with the accompanying drawings, nevertheless, it is to be understood that the invention is not confined to the disclosure but is susceptible of such changes and modifications as shall define no material departure from the salient features of the invention as expressed in the appended claims.

In the drawings—

Figure 1 is a front view in elevation of my device for burnishing scraper blades, Figure 2 is a side view of the device, Figure 3 is a top plan view of the device, Figure 4 is a transverse vertical section taken along the line 4—4 of Figure 1, Figure 5 is a rear view in elevation of the device for burnishing scraper blades, and Figure 6 is a horizontal section of the device taken along the line 6—6 of Figure 1.

Referring more particularly to the drawings 10 designates a base member from which rises a vertical standard 11 having an angular offset portion 12 at the upper end forming a table. Screws or bolts 13 provide means for securing the base to a bench.

Ears 15 project forwardly from the side edges of the standard and are perforated to receive a bolt or axle 16 which has heads 16a to retain the bolt in place. A bearing or sleeve 17 formed integrally with a clamping plate 18 receives neatly the axle for retaining said plate rockably in place. A bolt 20 having a winged head 21 is threaded into a passage in a reduced depending portion 22 of the clamping plate so that when the bolt is screwed inwardly the free end thereof will engage one face of a scraper blade 23 and force the lower end of said plate outwardly while the upper end of the plate will clamp the scraper blade 23 rigidly against the front face of the standard 11 as shown in Figure 4.

A supporting plate 25 for retaining the blade 23 in an adjusted position on the standard 11 is provided with spaced feet 26 disposed at right angles to the plate and received by guiding slots 27 formed in the standard. Said plate has extensions 28 at its upper edge and slots 29 are located vertically and in parallel relation in the plate proper and in the extensions. Bolts 30 threaded into passages in the standard 11 secure the plate in an adjusted position for supporting the blade 23 on the feet 26 so that the cutting edge 31 of the blade 23 will be retained in close association with a burnishing tool 32.

An ear 33 is attached to one end edge of the table 12 while an ear 34 is secured to the opposite end edge of said table. The ears are perforated to receive and support a rod 35 which is received by a passage 36 in a crosshead 37 slidable on the rod. A passage 38 leading from the top of the crosshead to the passage 36 (Figure 4) is adapted to supply lubricant to the rod 35.

The burnisher 32 is triangular in cross-section and is mounted slidably in a passage 40 (Figure 1) in the cross head or block 37 so that one of the three edges 41 of the member 32 may be employed for burnishing the cutting edge 31 of the blade 23 in a manner which will be explained presently. Handles 42 and 43 are mounted on the ends of the burnisher 32 in any approved manner and may be removed when necessary for withdrawing the burnisher from the neatly fitting passage 40 in the crosshead.

It will be noted from Figures 1 and 2 that the supporting ears 33 and 34 are offset from each other. In other words, the ear 34 is located adjacent the inner side edge of the table 12 while the ear 33 is disposed adjacent the rear or free edge of said table so that the rod 35 (Figure 3)

will be disposed in a vertical plane which is at an acute angle to a vertical plane passing through the longitudinal axis of the axle 16 or a vertical plane passing through the cutting edge 31 of the blade 23. The angular disposition of the rod 35 with respect to the cutting edge 31 provides for a more effective burnishing of the cutting edge.

The operation of my device is as follows: After the bolt 20 has been released sufficiently, the blade 23 is placed against the front flat face of the standard 11 with the lower edge of the blade resting on the feet 26 of the adjustable plate. This plate is then raised until the cutting edge 31 is projected sufficiently above the inner edge 12a of the table 12. The bolts 30 are tightened for retaining the plate 25 and feet 26 in position. The bolt 20 is turned for causing the member 18 to clamp the blade 23 rigidly against the standard 11.

The burnisher 32 and the supporting crosshead 37 are positioned adjacent the ear 34 with the edge 41 of the burnisher resting on the cutting edge 31 of the blade. Force is applied manually to the handles 42 and 43 and the burnisher is moved over said cutting edge once and a uniform edge will be formed so that when the blade is employed in a scraper it will remove a shaving of uniform thickness throughout the width of the blade. In order to form a cutting edge which will produce a shaving of greater thickness, the burnisher will be drawn over the cutting edge 31 several times.

The various elements of the device may be manufactured from brass, cast iron, aluminum or pressed steel with the exception of the burnisher 32 and the crosshead 37 which are formed of steel. Certain of the elements may be cast from the metals.

It will be noted that the ears 33 and 34 not only retain the rod 35 at an acute angle to the edge 12a of the table 12 but hold said rod above the table at an acute angle to the surface of the table. The two angular dispositions of the rod with respect to the table and likewise to the cutting edge of the blade 23 provide not only a progressively moving surface of the tool on the cutting edge 31 but also an equal pressure of the tool throughout the length of said cutting edge.

The ears 33 and 34 are offset from each other relative to a vertical plane passing through the standard 11 for maintaining the burnisher at an acute angle to the cutting edge 21 of the blade to be treated to eliminate friction and to form a neat smooth edge.

The burnisher 32 may be removed. However, this is not necessary, since the scraper blade 23 may be withdrawn after the burnisher has been shifted to one side and the bolt 20 has been released.

What I claim:

1. A burnishing tool for scraper blades comprising a vertical standard, means securing the standard rigidly to a bench, a clamping plate, means rockably mounting an intermediate portion of the plate on the standard, an adjustable means on the standard for supporting a scraper blade between the standard and the clamping plate, means causing the clamping plate to bind the blade onto the standard, a table projecting from the upper edge of the standard, a crosshead, means for slidably mounting the crosshead above the table, said crosshead provided with a passage extending transversely of the table and a burnisher in the passage guided by the crosshead for engagement with the cutting edge of the scraper, the angular disposition of the burnisher relative to the vertical plane of the standard determining the angular turning of the cutting edge of the scraper blade.

2. A burnishing tool for scraper blades comprising a vertical standard, means securing the standard rigidly to a bench, a clamping plate, means rockably mounting an intermediate portion of the plate on the standard, a table extending from the upper end of the standard, a rod mounted above the table and inclined at an acute angle to the upper end of the standard, a crosshead slidable on the rod and provided with a passage, a burnishing tool received by the passage and disposed over the cutting edge of a scraper blade, means for causing the plate to clamp the scraper blade rigidly against the standard, and means on the standard for adjustably positioning the blade thereon.

3. A burnishing tool for scraper blades comprising a vertical standard, means securing the standard rigidly to a bench, a clamping plate, means rockably mounting an intermediate portion of the plate on the standard, a table extending from the upper end of the standard, a rod mounted above the table and inclined at an acute angle to the upper end of the standard, a crosshead slidable on the rod and provided with a passage, a burnishing tool received by the passage and disposed over the cutting edge of a scraper blade, means for causing the plate to clamp the scraper blade rigidly against the standard, and means on the standard for adjustably positioning the blade thereon, means for supporting the rod at an acute angle to the plane of the table.

SHERMAN A. COURTER.

REFERENCES CITED

The following references are of record in the file of this patent:

UNITED STATES PATENTS

| Number | Name | Date |
|---|---|---|
| 945,771 | Ensminger | Jan. 11, 1910 |
| 956,350 | Hillstrom | Apr. 26, 1910 |
| 1,167,371 | Allen | Jan. 11, 1916 |